United States Patent
Ginzboorg et al.

(10) Patent No.: US 9,414,223 B2
(45) Date of Patent: Aug. 9, 2016

(54) SECURITY SOLUTION FOR INTEGRATING A WIFI RADIO INTERFACE IN LTE ACCESS NETWORK

(75) Inventors: Philip Ginzboorg, Espoo (FI); Esa M. Malkamaki, Espoo (FI); Enrico Rantala, Iittala (FI); Antti S. Sorri, Helsinki (FI); Mikko A. Uusitalo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 51 days.

(21) Appl. No.: 13/399,293

(22) Filed: Feb. 17, 2012

(65) Prior Publication Data
US 2013/0216043 A1    Aug. 22, 2013

(51) Int. Cl.
| | |
|---|---|
| *H04L 29/06* | (2006.01) |
| *H04W 12/02* | (2009.01) |
| *H04B 7/216* | (2006.01) |
| *H04W 80/02* | (2009.01) |
| *H04W 84/12* | (2009.01) |

(52) U.S. Cl.
CPC ............. *H04W 12/02* (2013.01); *H04L 63/205* (2013.01); *H04W 80/02* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 8,676,164 B2* | 3/2014 | Iwamura | ............... | H04W 12/04 370/329 |
| 2004/0142744 A1* | 7/2004 | Atkinson et al. | ................ | 463/29 |
| 2006/0014526 A1* | 1/2006 | Cherian | .................. | H04W 8/22 455/412.1 |
| 2007/0043940 A1 | 2/2007 | Gustave et al. | ............... | 713/150 |
| 2007/0291770 A1* | 12/2007 | Kitazoe | .............. | H04J 11/0093 370/395.52 |
| 2008/0192925 A1 | 8/2008 | Sachs et al. | | |
| 2008/0247373 A1* | 10/2008 | Synnergren | ........... | H04L 12/189 370/340 |
| 2008/0273682 A1* | 11/2008 | Bakker | ............. | H04M 3/42314 379/201.12 |
| 2009/0041246 A1* | 2/2009 | Kitazoe | ................. | H04W 12/02 380/270 |
| 2009/0131050 A1* | 5/2009 | Osborn | ............... | H04W 76/022 455/435.1 |
| 2009/0186601 A1* | 7/2009 | Hahn | ...................... | H04L 63/08 455/411 |
| 2009/0221304 A1* | 9/2009 | Pudney | ................. | H04W 68/00 455/458 |
| 2010/0166184 A1* | 7/2010 | Wu | ........................ | H04W 12/04 380/270 |
| 2010/0257355 A1* | 10/2010 | Shinozaki | ..................... | 713/153 |
| 2010/0316026 A1* | 12/2010 | Lee | ....................... | H04L 1/0028 370/336 |
| 2010/0323714 A1* | 12/2010 | Schmidt | ............... | H04W 48/18 455/456.1 |

(Continued)

FOREIGN PATENT DOCUMENTS

WO    WO 201212175 A1 *    9/2012    .............. H04L 27/26

OTHER PUBLICATIONS

3GPP TSG-RAN Meeting #53, Fukuoka, Japan (Sep. 13-16, 2011), RP-111094, Intel Corporation, "Discussions on Carrier Aggregation Across LTE and WiFi", (4 pages).

(Continued)

*Primary Examiner* — Abu Sholeman
*Assistant Examiner* — Maung Lwin
(74) *Attorney, Agent, or Firm* — Harrington & Smith

(57) ABSTRACT

A method for security for inter-RAT carrier aggregation is disclosed. The method includes encrypting a message using an encryption technique for a first RAT. The method also includes sending, to a UE, at least a portion of the encrypted message using a different, second RAT. Sending using the second RAT does not further encrypt the at least a portion of the encrypted message. The method further includes receiving the at least a portion of the message encrypted using the first RAT protocol. Receiving uses the second, different RAT. The method also includes decrypting the at least a portion of the message using the first RAT protocol. Apparatus and computer readable media are also described.

16 Claims, 4 Drawing Sheets

(56) References Cited

U.S. PATENT DOCUMENTS

| | | | |
|---|---|---|---|
| 2011/0016309 A1 | 1/2011 | Motoyama et al. | 713/153 |
| 2011/0134831 A1 | 6/2011 | Pirskanen | |
| 2011/0201323 A1* | 8/2011 | Wu et al. | 455/418 |
| 2011/0246777 A1* | 10/2011 | Buckley | H04L 9/0844 713/172 |
| 2011/0268048 A1* | 11/2011 | Toskala et al. | 370/329 |
| 2011/0275359 A1* | 11/2011 | Sebire et al. | 455/422.1 |
| 2011/0280204 A1* | 11/2011 | Nourbakhsh | H04W 88/06 370/329 |
| 2011/0305339 A1* | 12/2011 | Norrman | H04W 12/04 380/270 |
| 2012/0039471 A1* | 2/2012 | Kim et al. | 380/270 |
| 2012/0140743 A1* | 6/2012 | Pelletier et al. | 370/335 |
| 2012/0203822 A1* | 8/2012 | Floyd et al. | 709/203 |
| 2012/0271938 A1* | 10/2012 | Livet | H04W 60/005 709/224 |
| 2013/0195268 A1* | 8/2013 | Norrman | H04W 12/04 380/247 |

OTHER PUBLICATIONS

3GPP TR 36.913 V10.0.0 (Mar. 2011), Technical Report, 3$^{rd}$ Generation Partnership Project; Technical Specification Group Radio Access Network; Requirements for Further Advancements for Evolved Universal Terrestrial Radio Access (E-UTRA) (LTE-Advanced), (Release 10), (15 pages).

3GPP TS 36.300 V11.0.0 (Dec. 2011), Technical Specification, 3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 11), (194 pages).

Carneiro, G.; Ruela, J.; Ricardo, M., "Cross-layer design in 4G wireless terminals," Wireless Communications, IEEE, vol. 11, No. 2, pp. 7,13, Apr. 2004.

* cited by examiner

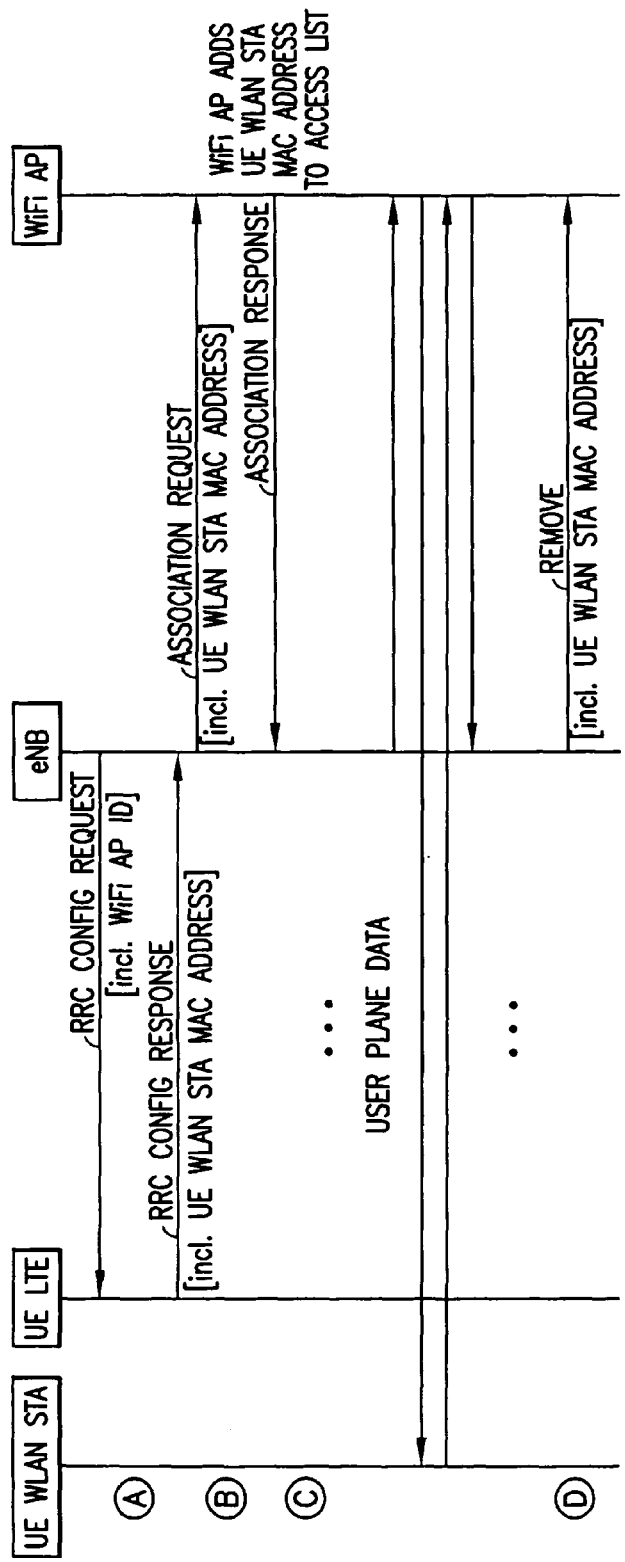

SECURITY SOLUTION FOR INTEGRATING A WIFI RADIO INTERFACE IN LTE ACCESS NETWORK

TECHNICAL FIELD

The exemplary and non-limiting embodiments of this invention relate generally to wireless communication systems, methods, devices and computer programs and, more specifically, relate to inter-RAT carrier aggregation.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
AP access point
BW bandwidth
CC component carrier
CDM code division multiplexing
CRC cyclic redundancy check
DL downlink (eNB towards UE)
DoS denial of service
eNB E-UTRAN Node B (evolved Node B)
EPC evolved packet core
E-UTRAN evolved UTRAN (LTE)
HARQ hybrid automatic repeat request
HFC hybrid fiber coaxial
HSPA high speed packet access
IMT-A international mobile telephony-advanced
ITU international telecommunication union
ITU-R ITU radiocommunication sector
LTE long term evolution of UTRAN (E-UTRAN)
MAC medium access control (layer 2, L2)
MM/MME mobility management/mobility management entity
Node B base station
O&M operations and maintenance
OFDMA orthogonal frequency division multiple access
PDCP packet data convergence protocol
PDU protocol data unit
PHY physical (layer 1, L1)
RAT radio access technology
RLC radio link control
RLC-SN radio link control sequence number
RRC radio resource control
RRM radio resource management
SC-FDMA single carrier, frequency division multiple access
S-GW serving gateway
SIM subscriber identity module
SRB signaling radio bearer
STA station
TCP transmission control protocol
UE user equipment, such as a mobile station or mobile terminal
UL uplink (UE towards eNB)
UTRAN universal terrestrial radio access network
WLAN wireless local area network The specification of a communication system known as evolved UTRAN (E-UTRAN, also referred to as UTRAN-LTE or as E-UTRA) is currently nearing completion within the 3GPP. As specified the DL access technique is OFDMA, and the UL access technique is SC-FDMA.

One specification of interest is 3GPP TS 36.300, V8.12.0 (2010-04), "3rd Generation Partnership Project; Technical Specification Group Radio Access Network; Evolved Universal Terrestrial Radio Access (E UTRA) and Evolved Universal Terrestrial Access Network (E UTRAN); Overall description; Stage 2 (Release 8)," incorporated by reference herein in its entirety. This system may be referred to for convenience as LTE Rel-8 (which also contains 3G HSPA and its improvements). In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.9.0 (2011-12), incorporated by reference herein in its entirety, and Release 10 versions of at least some of these specifications have been published including 3GPP TS 36.300, V10.6.0 (2011-12), incorporated by reference herein in its entirety. Even more recently, Release 11 versions of at least some of these specifications have been published including 3GPP TS 36.300, V11.0.0 (2011-12), incorporated by reference herein in its entirety.

FIG. 1 reproduces FIG. 4-1 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE (not shown). The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many-to-many relationship between MMEs/S-GW and eNBs.

The eNB hosts the following functions:
 functions for RRM: Radio Bearer Control, Radio Admission Control, Connection Mobility Control, Dynamic allocation of resources to UEs in both UL and DL (scheduling);
 IP header compression and encryption of the user data stream;
 selection of a MME at UE attachment;
 routing of User Plane data towards the Serving Gateway;
 scheduling and transmission of paging messages (originated from the MME);
 scheduling and transmission of broadcast information (originated from the MME or O&M); and
 a measurement and measurement reporting configuration for mobility and scheduling.

Of particular interest herein are the further releases of 3GPP LTE (e.g., LTE Rel-10) targeted towards future IMT-A systems, referred to herein for convenience simply as LTE-Advanced (LTE-A). Reference in this regard may be made to 3GPP TR 36.913, V8.0.1 (2009 03), 3rd Generation Partnership Project; Technical Specification Group Radio Access Network; Requirements for Further Advancements for E UTRA (LTE-Advanced) (Release 8), incorporated by reference herein in its entirety. A goal of LTE-A is to provide significantly enhanced services by means of higher data rates and lower latency with reduced cost. LTE-A is directed toward extending and optimizing the 3GPP LTE Rel-8 radio access technologies to provide higher data rates at very low cost. LTE-A will most likely be part of LTE Rel-10. LTE-A will be a more optimized radio system fulfilling the ITU-R requirements for IMT-A while maintaining backward compatibility with LTE Rel-8. Reference is further made to a Release 9 version of 3GPP TR 36.913, V9.0.0 (2009-12), incorporated by reference herein in its entirety. Reference is also made to a Release 10 version of 3GPP TR 36.913, V10.0.0 (2011-06), incorporated by reference herein in its entirety.

As is specified in 3GPP TR 36.913, LTE-A should operate in spectrum allocations of different sizes, including wider spectrum allocations than those of Rel-8 LTE (e.g., up to 100 MHz) to achieve the peak data rate of 100 Mbit/s for high mobility and 1 Gbit/s for low mobility. It has been agreed that carrier aggregation is to be considered for LTE-A in order to support bandwidths larger than 20 MHz. Carrier aggregation, where two or more component carriers (CCs) are aggregated, is considered for LTE-A in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation as in LTE Rel-8.

A terminal may simultaneously receive one or multiple component carriers depending on its capabilities. A LTE-A terminal with reception capability beyond 20 MHz can simultaneously receive transmissions on multiple component carriers. A LTE Rel-8 terminal can receive transmissions on a single component carrier only, provided that the structure of the component carrier follows the Rel-8 specifications. Moreover, it is required that LTE-A should be backwards compatible with Rel-8 LTE in the sense that a Rel-8 LTE terminal should be operable in the LTE-A system, and that a LTE-A terminal should be operable in a Rel-8 LTE system.

FIG. 2 shows an example of the carrier aggregation, where M Rel-8 component carriers are combined together to form M×Rel-8 BW (e.g., 5×20 MHz=100 MHz, given that M=5). Rel-8 terminals receive/transmit on one component carrier, whereas LTE-A terminals may receive/transmit on multiple component carriers simultaneously to achieve higher (wider) bandwidths.

With further regard to carrier aggregation, what is implied is that one eNB can effectively contain more than one cell on more than one CC (frequency carrier), and the eNB can utilize one (as in E-UTRAN Rel-8) or more cells (in an aggregated manner) when assigning resources and scheduling the UE.

The amount of wireless data might increase 100 fold in 5 years. Already smart phones are facing a lack of capacity in their networks. All methods to help with this are welcome. One approach is to use carrier aggregation over a plurality of radio access technologies (RATs). For example, one carrier may be in an unlicensed frequency (e.g., WLAN). This carrier may then be used in cooperation with an LTE carrier, to transmit data. This requires that both devices, for example, a user equipment (UE) and a LTE access point (AP), have at least two radio interfaces, e.g., one for LTE and one for WiFi (IEEE 802.11).

As more devices move to use inter-RAT carrier aggregation, security for the various RATs will be needed. Currently, different RATs (e.g., LTE and WiFi) have their own security solutions, independent of each other. Meeting the needs for these various security solutions when using inter-RAT CA can incur a heavy configuration and processing burden on both the receiver and transmitter.

What is needed is a technique to provide security for inter-RAT carrier aggregation which is easy for the network operator to configure and does not overly burden the receiver and transmitter.

SUMMARY

The below summary section is intended to be merely exemplary and non-limiting.

The foregoing and other problems are overcome, and other advantages are realized, by the use of the exemplary embodiments of this invention.

In a first aspect thereof an exemplary embodiment of this invention provides a method for security for inter-RAT carrier aggregation. The method includes encrypting a message using an encryption technique for a first RAT. The method also includes sending, to a UE, at least a portion of the encrypted message using a different, second RAT. Sending using the second RAT does not further encrypt the at least a portion of the encrypted message.

In another aspect thereof an exemplary embodiment of this invention provides a method for security for inter-RAT carrier aggregation. The method includes receiving at least a portion of a message encrypted using a first RAT protocol, where receiving uses a second, different RAT. The method also includes decrypting the at least a portion of the message using the first RAT protocol.

In a further aspect thereof an exemplary embodiment of this invention provides an apparatus for security for inter-RAT carrier aggregation. The apparatus includes at least one processor and at least one memory storing computer program code. The at least one memory and the computer program code are configured to, with the at least one processor, cause the apparatus to perform actions. The actions include encrypting a message using an encryption technique for a first RAT. The actions also include sending, to a UE, at least a portion of the encrypted message using a different, second RAT. Sending using the second RAT does not further encrypt the at least a portion of the encrypted message.

In another aspect thereof an exemplary embodiment of this invention provides an apparatus for security for inter-RAT carrier aggregation. The apparatus includes at least one processor and at least one memory storing computer program code. The at least one memory and the computer program code are configured to, with the at least one processor, cause the apparatus to perform actions. The actions include receiving at least a portion of a message encrypted using a first RAT protocol, where receiving uses a second, different RAT. The actions also include decrypting the at least a portion of the message using the first RAT protocol.

In a further aspect thereof an exemplary embodiment of this invention provides a computer readable medium for security for inter-RAT carrier aggregation. The computer readable medium is tangibly encoded with a computer program executable by a processor to perform actions. The actions include encrypting a message using an encryption technique for a first RAT. The actions also include sending, to a UE, at least a portion of the encrypted message using a different, second RAT. Sending using the second RAT does not further encrypt the at least a portion of the encrypted message.

In another aspect thereof an exemplary embodiment of this invention provides a computer readable medium for security for inter-RAT carrier aggregation. The computer readable medium is tangibly encoded with a computer program executable by a processor to perform actions. The actions include receiving at least a portion of a message encrypted using a first RAT protocol, where receiving uses a second, different RAT. The actions also include decrypting the at least a portion of the message using the first RAT protocol.

In a further aspect thereof an exemplary embodiment of this invention provides an apparatus for security for inter-RAT carrier aggregation. The apparatus includes means for encrypting a message using an encryption technique for a first RAT. The apparatus also includes means for sending, to a UE, at least a portion of the encrypted message using a different, second RAT. The sending means does not further encrypt the at least a portion of the encrypted message.

In another aspect thereof an exemplary embodiment of this invention provides an apparatus for security for inter-RAT carrier aggregation. The apparatus includes means for receiving at least a portion of a message encrypted using a first RAT protocol, where the receiving means uses a second, different RAT. The apparatus also includes means for decrypting the at least a portion of the message using the first RAT protocol.

BRIEF DESCRIPTION OF THE DRAWINGS

The foregoing and other aspects of exemplary embodiments of this invention are made more evident in the following Detailed Description, when read in conjunction with the attached Drawing Figures, wherein:

FIG. 5 is a signaling diagram that illustrates the operation of a non-limiting exemplary embodiment of this invention.

FIG. 6 is a logic flow diagram that illustrates the operation of an exemplary method, and a result of execution of computer program instructions embodied on a computer readable memory, in accordance with various exemplary embodiments of this invention.

DETAILED DESCRIPTION

Various exemplary embodiments in accordance with this invention provide techniques for providing security to inter-RAT CA. By encrypting messages once only, processing power is saved over traditional techniques which attempt to implement security solutions for each RAT used. Additionally, transmission delays can be reduced as excessive security operations are avoided. Moreover, the operator saves the costs of creating separate authentication infrastructure for each RAT.

Figure 3:
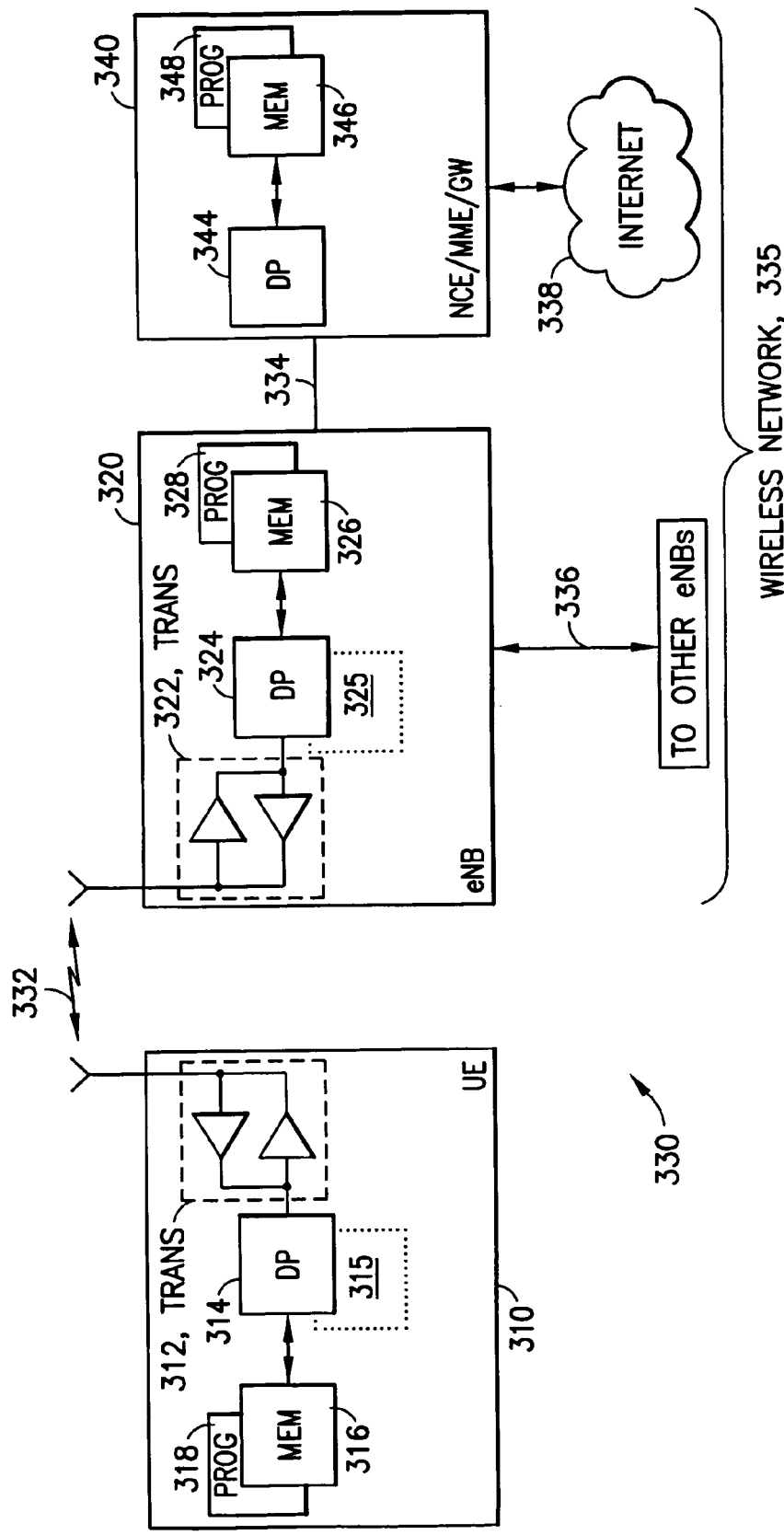
FIG. 3 shows a simplified block diagram of exemplary electronic devices that are suitable for use in practicing various exemplary embodiments of this invention.

Before describing in further detail various exemplary embodiments of this invention, reference is made to FIG. 3 for illustrating a simplified block diagram of various electronic devices and apparatus that are suitable for use in practicing exemplary embodiments of this invention.

Figure 1:
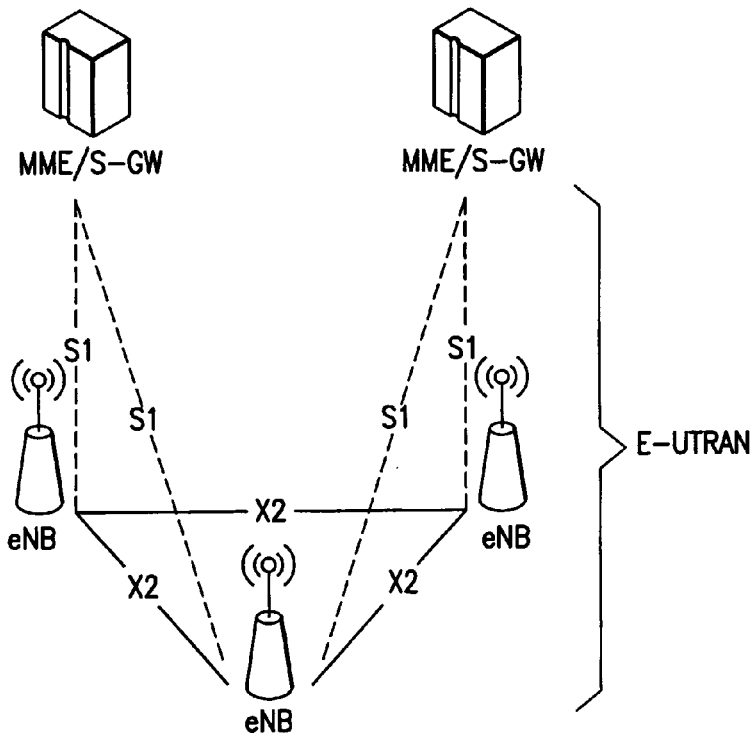
FIG. 1 reproduces FIG. 4-1 of 3GPP TS 36.300, and shows the overall architecture of the E UTRAN system.
Figure 2:
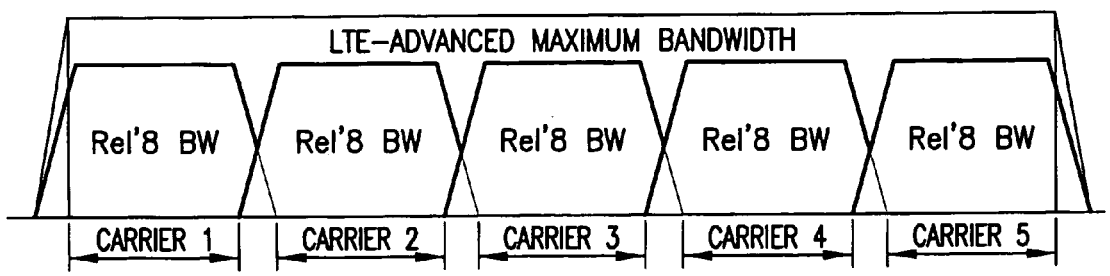
FIG. 2 shows an example of carrier aggregation as proposed for the LTE-A system.

In the wireless system 330 of FIG. 3, a wireless network 335 is adapted for communication over a wireless link 332 with an apparatus, such as a mobile communication device which may be referred to as a UE 310, via a network access node, such as a Node B (base station), and more specifically an eNB 320. The network 335 may include a network control element (NCE) 340 that may include the MME/SGW functionality shown in FIG. 1, and which provides connectivity with a network, such as a telephone network and/or a data communications network (e.g., the internet 338).

The UE 310 includes a controller, such as a computer or a data processor (DP) 314, a computer-readable memory medium embodied as a memory (MEM) 316 that stores a program of computer instructions (PROG) 318, and a suitable wireless interface, such as radio frequency (RF) transceiver 312, for bidirectional wireless communications with the eNB 320 via one or more antennas.

The eNB 320 also includes a controller, such as a computer or a data processor (DP) 324, a computer-readable memory medium embodied as a memory (MEM) 326 that stores a program of computer instructions (PROG) 328, and a suitable wireless interface, such as RF transceiver 322, for communication with the UE 310 via one or more antennas. The eNB 320 is coupled via a data/control path 334 to the NCE 340. The path 334 may be implemented as the S1 interface shown in FIG. 1. The eNB 320 may also be coupled to another eNB via data/control path 336, which may be implemented as the X2 interface shown in FIG. 1.

The NCE 340 includes a controller, such as a computer or a data processor (DP) 344, a computer-readable memory medium embodied as a memory (MEM) 346 that stores a program of computer instructions (PROG) 348.

At least one of the PROGs 318, 328 and 348 is assumed to include program instructions that, when executed by the associated DP, enable the device to operate in accordance with exemplary embodiments of this invention, as will be discussed below in greater detail.

That is, various exemplary embodiments of this invention may be implemented at least in part by computer software executable by the DP 314 of the UE 310; by the DP 324 of the eNB 320; and/or by the DP 344 of the NCE 340, or by hardware, or by a combination of software and hardware (and firmware).

The UE 310 and the eNB 320 may also include dedicated processors, for example LTE encryption processor 315 and LTE encryption processor 325.

In general, the various embodiments of the UE 310 can include, but are not limited to, cellular telephones, tablets having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 316, 326 and 346 may be of any type suitable to the local technical environment and may be implemented using any suitable data storage technology, such as semiconductor based memory devices, flash memory, magnetic memory devices and systems, optical memory devices and systems, fixed memory and removable memory. The DPs 314, 324 and 344 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 312 and 322) may be of any type suitable to the local technical environment and may be implemented using any suitable communication technology such as individual transmitters, receivers, transceivers or a combination of such components.

Figure 4:
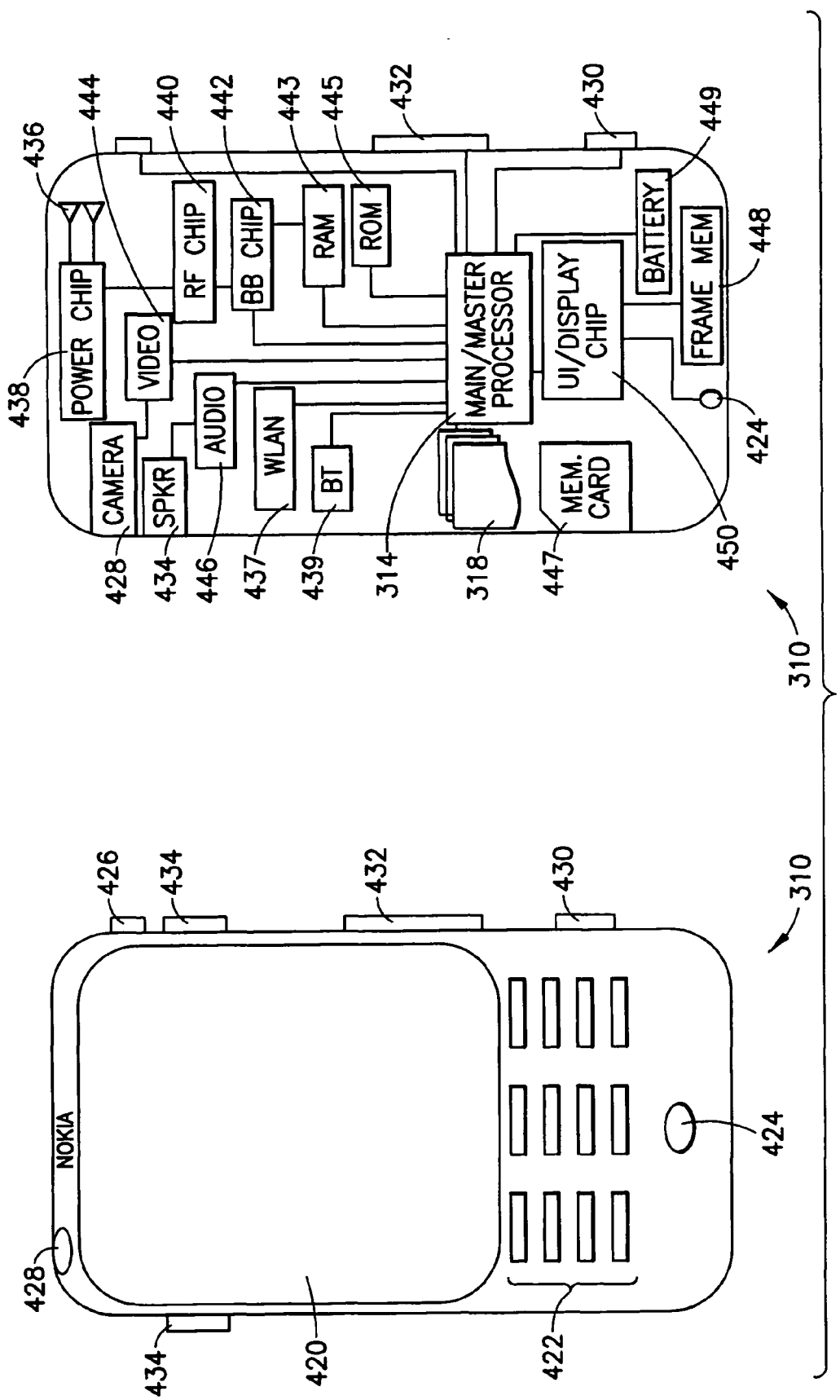
FIG. 4 shows a more particularized block diagram of an exemplary user equipment such as that shown at FIG. 3.

FIG. 4 illustrates further detail of an exemplary UE in both plan view (left) and sectional view (right), and the invention may be embodied in one or some combination of those more function-specific components. At FIG. 4 the UE 310 has a graphical display interface 420 and a user interface 422 illustrated as a keypad but understood as also encompassing touch-screen technology at the graphical display interface 420 and voice-recognition technology received at the microphone 424. A power actuator 426 controls the device being turned on and off by the user. The exemplary UE 310 may have a camera 428 which is shown as being forward facing (e.g., for video calls) but may alternatively or additionally be rearward facing (e.g., for capturing images and video for local storage). The camera 428 is controlled by a shutter actuator 430 and optionally by a zoom actuator 432 which may alternatively function as a volume adjustment for the speaker(s) 434 when the camera 428 is not in an active mode.

Within the sectional view of FIG. 4 are seen multiple transmit/receive antennas 436 that are typically used for cellular communication. The antennas 436 may be multi-band for use with other radios in the UE. The operable ground plane for the antennas 436 is shown by shading as spanning the entire space enclosed by the UE housing though in some embodiments the ground plane may be limited to a smaller area, such as disposed on a printed wiring board on which the power chip 438 is formed. The power chip 438 controls power amplification on the channels being transmitted and/or across the antennas that transmit simultaneously where spatial diversity is used, and amplifies the received signals. The power chip 438 outputs the amplified received signal to the radio-frequency (RF) chip 440 which demodulates and downconverts the signal for baseband processing. The baseband (BB) chip 442 detects the signal which is then converted to a bit-stream and finally decoded. Similar processing occurs in reverse for signals generated in the apparatus 310 and transmitted from it.

Signals to and from the camera 428 pass through an image/video processor 444 which encodes and decodes the various image frames. A separate audio processor 446 may also be present controlling signals to and from the speakers 434 and the microphone 424. The graphical display interface 420 is refreshed from a frame memory 448 as controlled by a user interface chip 450 which may process signals to and from the display interface 420 and/or additionally process user inputs from the keypad 422 and elsewhere.

Certain embodiments of the UE 310 may also include one or more secondary radios such as a wireless local area network radio WLAN 437 and a Bluetooth® radio 439, which may incorporate an antenna on-chip or be coupled to an off-chip antenna. Throughout the apparatus are various memories such as random access memory RAM 443, read only memory ROM 445, and in some embodiments removable memory such as the illustrated memory card 447. The various programs 318 are stored in one or more of these memories. All of these components within the UE 310 are normally powered by a portable power supply such as a battery 449.

Processors 438, 440, 442, 444, 446, 450, if embodied as separate entities in a UE 310 or eNB 320, may operate in a slave relationship to the main processor 314, 324, which may then be in a master relationship to them. Embodiments of this invention are most relevant to the WLAN 437 and antennas 436, though it is noted that other embodiments need not be disposed there but may be disposed across various chips and memories as shown or disposed within another processor that combines some of the functions described above for FIG. 4. Any or all of these various processors of FIG. 4 access one or more of the various memories, which may be on-chip with the processor or separate therefrom. Similar function-specific components that are directed toward communications over a network broader than a piconet (e.g., components 436, 438, 440, 442-445 and 447) may also be disposed in exemplary embodiments of the access node 320, which may have an array of tower-mounted antennas rather than the two shown at FIG. 4.

Note that the various chips (e.g., 438, 440, 442, etc.) that were described above may be combined into a fewer number than described and, in a most compact case, may all be embodied physically within a single chip.

Various exemplary embodiments in accordance with this invention focus on arranging security in an optimal way when combining two or more RATs (e.g., LTE and WiFi).

In one non-limiting exemplary embodiment in accordance with this invention, LTE and WiFi co-exist on same node. LTE and WiFi share the LTE PDCP and RLC. Data is split between the RATs below the LTE RLC layer. However, the encryption of the user data takes place in LTE PDCP layer. Thus, the data forwarded for WiFi transmission is already encrypted. The additional data encryption for WiFi is therefore not necessary.

In order to facilitate the use of WiFi RAT in LTE, the WLAN MAC addresses may be bound to (e.g., associated with) an LTE identity. The WiFi AP can then use the bound MAC addresses for filtering the incoming transmissions and, thus, be able to distinguish distinct relevant messages from other traffic.

The binding between a WLAN MAC address and the LTE identity may be deleted, e.g., by a control message from the UE. Alternatively, it may expire after a period of time. For example, the temporary binding expires after ten minutes, unless the UE refreshes the binding. In the latter case, the binding between a WLAN MAC address and the LTE identity is valid for another ten minutes.

Utilizing a single encryption for the data (e.g., LTE encryption) saves processing over the technique of tunneling encrypted LTE packets, for example, via an encrypted WLAN interface. In the tunneling technique, packets are first encrypted for the LTE system, then, in order to transmit the packets via the WLAN interface, the packets are encrypted again using WLAN encryption. The 'double' encryption of the same data wastes processing power (and increases energy consumption), and adds unnecessarily delays to the system.

Lack of additional encryption on the second RAT (e.g., WLAN) does not render the communications unprotected. Rather, the LTE encryption provides sufficient security (as it would for LTE transmissions). Therefore, the security of the inter-RAT communications is maintained.

Messages (e.g., RRC message) sent on a signaling radio bearer (SRB) may be integrity protected as well as encrypted. If the integrity verification in the receiver fails, the packet data unit (PDU) can be discarded and the integrity verification failure indicated to an upper layer (e.g., RRC). Similar integrity protection can be added to the WLAN RAT.

Just as denial of service (DoS) attacks may be launched through a LTE radio interface of the AP, the WLAN interface may also be subject to such attacks. In these situations, the AP is flooded with false communication requests in order to tie up the resources of the AP (e.g., the processor).

While, the attacker may not know the secret keys of a legitimate UE, the attacker may nevertheless impersonates the WiFi interface of a legitimate UE by 'spoofing' the UE's MAC address. The attacker may then attempt to inject user plane messages into the LTE Access Point (AP) through the WiFi interface of the AP. The LTE header in the injected message must look as if it originates in the legitimate UE that the attacker impersonates. In particular, the sequence number in the LTE header (which may also include the HFC, RLC-SN pair, etc.) should follow the sequence number in the last message of the legitimate UE.

If the integrity of the user plane messages in the LTE RAT is not protected, the decryption function in the PDCP layer of the AP does not notice that the sender is bogus and forwards the random string to the higher layers in the LTE protocol stack. However, the AP decryption in the PDCP layer of the attacker's 'messages' returns a string of random bits, because the attacker does not have the secret key shared between the AP and the legitimate UE. If the implementation of those higher layers is not robust against garbage input, then parts of AP may restart, or 'hung'. But even a legitimate UE may sometimes send 'garbage' random strings in its user-plane messages. Accordingly, the higher layers in the LTE stack already should be robust against garbage input. Thus, there is no need for additional integrity protection in the WiFi interface.

The PDCP layer encrypts the outgoing user data. When the UE receives the data (either via LTE or WiFi signaling), the data is decrypted at the UE's PDCP layer. The UE does not know at the PDCP layer whether the decryption was successful or not. This can be detected at a higher layer (e.g., UDP or TCP), for example, by using CRC or determining whether a check sum passes or fails.

In order to forward user data (e.g., PDUs intended for the UE) via the WiFi AP, the UE's MAC addresses are added in the WiFi AP's access list. Signaling in the LTE creates a binding of the UE WLAN MAC address and the UE SIM identity. This can be done during a setup phase, e.g., with RRC signaling. The UE can signal its WLAN MAC address to the eNB which forwards it to the WiFi AP associated with the eNB.

FIG. 5 is a signaling diagram that illustrates the operation of a non-limiting exemplary embodiment of this invention. The signaling diagram shows messages sent during an exemplary LTE-WLAN setup. In phase A, the eNB signals via LTE to the UE to configure for LTE-WLAN operation. This message may contain the identification of the WiFi AP (WiFi AP ID). The ID is used when the WLAN connection is active. The UE responds to the configure request by giving a WLAN STA ID (e.g., the MAC address of the UE).

At stage B, the eNB signals the WiFi AP to add the UE to its access list. The access list may be used to filter out the WLAN packets that were transmitted by stations that are not in the list. The WiFi AP is configured to pass WLAN packets that are not filtered/ignored to the eNB.

At stage C (after handshakes A and B), the user plane traffic is started. Later, at stage D, the eNB can then command the WiFi AP to remove the UE from the access list if the UE makes a handover to another eNB or there has not been sufficient activity in the WLAN channel for some period of time, or simply after a period of time in which a 'keep alive' control message has not been received from the UE.

Based on the foregoing it should be apparent that the exemplary embodiments of this invention provide a method, apparatus and computer program(s) to provide security for inter-RAT carrier aggregation.

FIG. 6 is a logic flow diagram that illustrates the operation of a method, and a result of execution of computer program instructions, in accordance with the exemplary embodiments of this invention. In accordance with these exemplary embodiments a method performs, at Block 610, a step of encrypting a message using an encryption technique for a first RAT. At Block 620, the method performs a step of sending, to a UE, at least a portion of the encrypted message using a different, second RAT. Sending using the second RAT does not further encrypt the at least a portion of the encrypted message.

The various blocks shown in FIG. 6 may be viewed as method steps, and/or as operations that result from operation of computer program code, and/or as a plurality of coupled logic circuit elements constructed to carry out the associated function(s).

An exemplary embodiment in accordance with this invention provides a method for security for inter-RAT carrier aggregation. The method includes encrypting (e.g., by a processor) a message using an encryption technique for a first RAT. The method also includes sending (e.g., via a transmitter), to a UE, at least a portion of the encrypted message using a different, second RAT. Sending using the second RAT does not further encrypt the at least a portion of the encrypted message.

In a further exemplary embodiment of the method above, the first RAT protocol is a UTRAN PDCP.

In another exemplary embodiment of any one of the methods above, the second RAT is a WLAN.

In a further exemplary embodiment of any one of the methods above, the at least a portion of the encrypted message is a first portion. The method also includes splitting the encrypted message into the first portion and a second portion; and sending the second portion of the encrypted message using the first RAT.

In another exemplary embodiment of any one of the methods above, encrypting the message occurs at a first protocol layer, and sending the at least a portion of the encrypted message occurs at a lower second protocol layer.

In a further exemplary embodiment of any one of the methods above, the method also includes sending, to the UE using the first RAT, instructions for the UE to configure for operation on the second RAT; receiving, from the UE using the first RAT, a MAC address of the UE on the second RAT; and adding the MAC address to an access list for a second RAT access point. The instructions may include an identification of a second RAT access point. The method may also include, in response to a lack of activity for the UE on the second RAT, removing the MAC address from the access list.

In another exemplary embodiment of the method above, the method also includes removing the MAC address from the access list in response to the expiration of a timer (e.g., after ten minutes).

In a further exemplary embodiment of the method above, the method also includes receiving a refresh command from the UE and, in response to receiving the refresh command, resetting the timer.

Another exemplary embodiment in accordance with this invention provides a method for security for inter-RAT carrier aggregation. The method includes receiving (e.g., via a receiver) at least a portion of a message encrypted using a first RAT protocol, where receiving uses a second, different RAT. The method also includes decrypting (e.g., by a processor) the at least a portion of the message using the first RAT protocol.

In a further exemplary embodiment of the method above, the method also includes binding MAC address of the second RAT to a first RAT identity.

In another exemplary embodiment of any one of the methods above, the method also includes filtering incoming transmissions on the second RAT using the MAC address of the second RAT.

In a further exemplary embodiment of any one of the methods above, decrypting the message occurs at a first protocol layer. The method also includes sending the decrypted message to a higher, second protocol layer. The first protocol layer may be a PDCP layer. The method may also include determining whether the decrypted message passes a cyclic redundancy check at the second protocol layer. The method may also include determining whether the decrypted message passes an integrity verification at the second protocol layer.

In another exemplary embodiment of any one of the methods above, the at least a portion of the encrypted message is a first portion. The method also includes receiving the second portion of the encrypted message using the first RAT; decrypting the second portion of the message using the first RAT protocol; and combining the decrypted first portion and the decrypted second portion to generate a decrypted message.

In a further exemplary embodiment of any one of the methods above, the first RAT protocol is a UTRAN PDCP.

In another exemplary embodiment of any one of the methods above, the second RAT is a WLAN.

In a further exemplary embodiment of any one of the methods above, the method also includes receiving, using the first RAT, instructions to configure a UE for operation on the second RAT; and sending, using the first RAT, a MAC address of the UE on the second RAT. The instructions may include an identification of a second RAT access point.

Another exemplary embodiment in accordance with this invention provides an apparatus for security for inter-RAT carrier aggregation. The apparatus includes at least one processor and at least one memory storing computer program code. The at least one memory and the computer program code are configured to, with the at least one processor, cause the apparatus to perform actions. The actions include encrypting a message using an encryption technique for a first RAT. The actions also include sending, to a UE, at least a portion of the encrypted message using a different, second RAT. Sending using the second RAT does not further encrypt the at least a portion of the encrypted message.

In a further exemplary embodiment of the apparatus above, the first RAT protocol is a UTRAN PDCP.

In another exemplary embodiment of any one of the apparatus above, the second RAT is a WLAN.

In a further exemplary embodiment of any one of the apparatus above, the at least a portion of the encrypted message is a first portion. The actions also include splitting the encrypted message into the first portion and a second portion; and sending the second portion of the encrypted message using the first RAT.

In another exemplary embodiment of any one of the apparatus above, encrypting the message occurs at a first protocol layer, and sending the at least a portion of the encrypted message occurs at a lower second protocol layer.

In a further exemplary embodiment of any one of the apparatus above, the actions also include sending, to the UE using the first RAT, instructions for the UE to configure for operation on the second RAT; receiving, from the UE using the first RAT, a MAC address of the UE on the second RAT; and adding the MAC address to an access list for a second RAT access point. The instructions may include an identification of a second RAT access point. The actions may also include, in response to a lack of activity for the UE on the second RAT, removing the MAC address from the access list.

In another exemplary embodiment of the apparatus above, the actions also include to remove the MAC address from the access list in response to the expiration of a timer (e.g., after ten minutes).

In a further exemplary embodiment of the apparatus above, the actions also include to receive a refresh command from the UE and, in response to receiving the refresh command, to reset the timer.

In another exemplary embodiment of any one of the apparatus above, the apparatus is embodied in an integrated circuit.

In a further exemplary embodiment of any one of the apparatus above, the apparatus is embodied in a mobile phone.

Another exemplary embodiment in accordance with this invention provides an apparatus for security for inter-RAT carrier aggregation. The apparatus includes at least one processor and at least one memory storing computer program code. The at least one memory and the computer program code are configured to, with the at least one processor, cause the apparatus to perform actions. The actions include receiving at least a portion of a message encrypted using a first RAT protocol, where receiving uses a second, different RAT. The actions also include decrypting the at least a portion of the message using the first RAT protocol.

In a further exemplary embodiment of the apparatus above, the actions also include binding MAC address of the second RAT to a first RAT identity.

In another exemplary embodiment of any one of the apparatus above, the actions also include filtering incoming transmissions on the second RAT using the MAC address of the second RAT.

In a further exemplary embodiment of any one of the apparatus above, decrypting the message occurs at a first protocol layer. The actions also include sending the decrypted message to a higher, second protocol layer. The first protocol layer may be a PDCP layer. The actions may also include determining whether the decrypted message passes a cyclic redundancy check at the second protocol layer. The actions may also include determining whether the decrypted message passes an integrity verification at the second protocol layer.

In another exemplary embodiment of any one of the apparatus above, the at least a portion of the encrypted message is a first portion. The actions also include receiving the second portion of the encrypted message using the first RAT; decrypting the second portion of the message using the first RAT protocol; and combining the decrypted first portion and the decrypted second portion to generate a decrypted message.

In a further exemplary embodiment of any one of the apparatus above, the first RAT protocol is a UTRAN PDCP.

In another exemplary embodiment of any one of the apparatus above, the second RAT is a WLAN.

In a further exemplary embodiment of any one of the apparatus above, the actions also includes receiving, using the first RAT, instructions to configure a UE for operation on the second RAT; and sending, using the first RAT, a MAC address of the UE on the second RAT. The instructions may include an identification of a second RAT access point.

In another exemplary embodiment of any one of the apparatus above, the apparatus is embodied in an integrated circuit.

In a further exemplary embodiment of any one of the apparatus above, the apparatus is embodied in a mobile phone.

Another exemplary embodiment in accordance with this invention provides a computer readable medium for security for inter-RAT carrier aggregation. The computer readable medium is tangibly encoded with a computer program executable by a processor to perform actions. The actions include encrypting a message using an encryption technique for a first RAT. The actions also include sending, to a UE, at least a portion of the encrypted message using a different, second RAT. Sending using the second RAT does not further encrypt the at least a portion of the encrypted message.

In a further exemplary embodiment of the computer readable medium above, the first RAT protocol is a UTRAN PDCP.

In another exemplary embodiment of any one of the computer readable media above, the second RAT is a WLAN.

In a further exemplary embodiment of any one of the computer readable media above, the at least a portion of the encrypted message is a first portion. The actions also include splitting the encrypted message into the first portion and a second portion; and sending the second portion of the encrypted message using the first RAT.

In another exemplary embodiment of any one of the computer readable media above, encrypting the message occurs at a first protocol layer, and sending the at least a portion of the encrypted message occurs at a lower second protocol layer.

In a further exemplary embodiment of any one of the computer readable media above, the actions also include sending, to the UE using the first RAT, instructions for the UE to configure for operation on the second RAT; receiving, from the UE using the first RAT, a MAC address of the UE on the second RAT; and adding the MAC address to an access list for a second RAT access point. The instructions may include an identification of a second RAT access point. The actions may also include, in response to a lack of activity for the UE on the second RAT, removing the MAC address from the access list.

In another exemplary embodiment of the computer readable media above, the actions also include removing the MAC address from the access list in response to the expiration of a timer (e.g., after ten minutes).

In a further exemplary embodiment of the computer readable media above, the actions also include receiving a refresh command from the UE and, in response to receiving the refresh command, resetting the timer.

In another exemplary embodiment of any one of the computer readable media above, the computer readable medium is a non-transitory computer readable medium (e.g., CD-ROM, RAM, flash memory, etc.

A further exemplary embodiment in accordance with this invention provides a computer readable medium for security for inter-RAT carrier aggregation. The computer readable medium is tangibly encoded with a computer program executable by a processor to perform actions. The actions include receiving at least a portion of a message encrypted using a first RAT protocol, where receiving uses a second, different RAT. The actions also include decrypting the at least a portion of the message using the first RAT protocol.

In another exemplary embodiment of the computer readable medium above, the actions also include binding MAC address of the second RAT to a first RAT identity.

In a further exemplary embodiment of any one of the computer readable media above, the actions also include filtering incoming transmissions on the second RAT using the MAC address of the second RAT.

In another exemplary embodiment of any one of the computer readable media above, decrypting the message occurs at a first protocol layer. The actions also include sending the decrypted message to a higher, second protocol layer. The first protocol layer may be a PDCP layer. The actions may also include determining whether the decrypted message passes a cyclic redundancy check at the second protocol layer. The actions may also include determining whether the decrypted message passes an integrity verification at the second protocol layer.

In a further exemplary embodiment of any one of the computer readable media above, the at least a portion of the encrypted message is a first portion. The actions also include receiving the second portion of the encrypted message using the first RAT; decrypting the second portion of the message using the first RAT protocol; and combining the decrypted first portion and the decrypted second portion to generate a decrypted message.

In another exemplary embodiment of any one of the computer readable media above, the first RAT protocol is a UTRAN PDCP.

In a further exemplary embodiment of any one of the computer readable media above, the second RAT is a WLAN.

In another exemplary embodiment of any one of the computer readable media above, the actions also include receiving, using the first RAT, instructions to configure a UE for operation on the second RAT; and sending, using the first RAT, a MAC address of the UE on the second RAT. The instructions may include an identification of a second RAT access point.

In a further exemplary embodiment of any one of the computer readable media above, the computer readable medium is a non-transitory computer readable medium (e.g., CD-ROM, RAM, flash memory, etc.

Another exemplary embodiment in accordance with this invention provides an apparatus for security for inter-RAT carrier aggregation. The apparatus includes means for encrypting (e.g., a processor) a message using an encryption technique for a first RAT. The apparatus also includes means for sending (e.g., a transmitter), to a UE, at least a portion of the encrypted message using a different, second RAT. The sending means does not further encrypt the at least a portion of the encrypted message.

In a further exemplary embodiment of the apparatus above, the first RAT protocol is a UTRAN PDCP.

In another exemplary embodiment of any one of the apparatus above, the second RAT is a WLAN.

In a further exemplary embodiment of any one of the apparatus above, the at least a portion of the encrypted message is a first portion. The apparatus also includes means for splitting the encrypted message into the first portion and a second portion; and means for sending the second portion of the encrypted message using the first RAT.

In another exemplary embodiment of any one of the apparatus above, encrypting the message occurs at a first protocol layer, and sending the at least a portion of the encrypted message occurs at a lower second protocol layer.

In a further exemplary embodiment of any one of the apparatus above, the apparatus also includes means for sending, to the UE using the first RAT, instructions for the UE to configure for operation on the second RAT; means for receiving, from the UE using the first RAT, a MAC address of the UE on the second RAT; and means for adding the MAC address to an access list for a second RAT access point. The instructions may include an identification of a second RAT access point. The apparatus may also include means for removing the MAC address from the access list in response to a lack of activity for the UE on the second RAT.

In another exemplary embodiment of the apparatus above, the apparatus also includes means for removing the MAC address from the access list in response to the expiration of a timer (e.g., after ten minutes).

In a further exemplary embodiment of the apparatus above, the apparatus also includes means for receiving a refresh command from the UE and, means for resetting the timer in response to receiving the refresh command.

Another exemplary embodiment in accordance with this invention provides an apparatus for security for inter-RAT carrier aggregation. The apparatus includes means for receiving (e.g., a receiving) at least a portion of a message encrypted using a first RAT protocol, where the receiving means uses a second, different RAT. The apparatus also includes means for decrypting (e.g., a processor) the at least a portion of the message using the first RAT protocol.

In a further exemplary embodiment of the apparatus above, the apparatus also includes means for binding MAC address of the second RAT to a first RAT identity.

In another exemplary embodiment of any one of the apparatus above, the apparatus also includes means for filtering incoming transmissions on the second RAT using the MAC address of the second RAT.

In a further exemplary embodiment of any one of the apparatus above, decrypting the message occurs at a first protocol layer. The apparatus also includes means for sending the decrypted message to a higher, second protocol layer. The first protocol layer may be a PDCP layer. The apparatus may also include means for determining whether the decrypted message passes a cyclic redundancy check at the second protocol layer. The apparatus may also include means for determining whether the decrypted message passes an integrity verification at the second protocol layer.

In another exemplary embodiment of any one of the apparatus above, the at least a portion of the encrypted message is a first portion. The apparatus also includes means for receiving the second portion of the encrypted message using the first RAT; means for decrypting the second portion of the message using the first RAT protocol; and means for combining the decrypted first portion and the decrypted second portion to generate a decrypted message.

In a further exemplary embodiment of any one of the apparatus above, the first RAT protocol is a UTRAN PDCP.

In another exemplary embodiment of any one of the apparatus above, the second RAT is a WLAN.

In a further exemplary embodiment of any one of the apparatus above, the apparatus also includes means for receiving, using the first RAT, instructions to configure a UE for operation on the second RAT; and means for sending, using the first RAT, a MAC address of the UE on the second RAT. The instructions may include an identification of a second RAT access point.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems such as for example (WLAN, UTRAN, GSM as appropriate).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
    encrypting a message using an encryption technique for a first radio access technology;
    sending, to a user equipment, at least a portion of the encrypted message using a different, second radio access technology,
    where sending using the second radio access technology does not further encrypt the at least a portion of the encrypted message; and
    filtering incoming transmissions on the second radio access technology using a medium access control address of the second radio access technology;
    wherein the method further comprises sending, to the user equipment using the first radio access technology, instructions for the user equipment to configure for operation on the second radio access technology, wherein the instructions include an identification of a second radio access technology access point, wherein the encrypted message is also integrity protected, and wherein the message is configured to discard a packet data unit and an integrity verification failure identification is indicated when an integrity verification fails;
    where the first radio access technology is a Universal Terrestrial Radio Access Network (UTRAN) packet data convergence protocol and the second radio access technology is a wireless local area network, wherein the encryption of the message comprises only a single Long Term Evolution (LTE) encrypted and wherein the sending of the at least a portion of the LTE encrypted message using the wireless local area network does not further encrypt the at least a portion of the LTE encrypted message.

2. The method of claim 1, where the at least a portion of the encrypted message is a first portion, the method further comprising:
splitting the encrypted message into the first portion and a second portion; and
sending the second portion of the encrypted message using the first radio access technology.

3. The method of claim 1, where encrypting the message occurs at a first protocol layer, and sending the at least a portion of the encrypted message occurs at a lower second protocol layer.

4. The method of claim 1, further comprising:
receiving, from the user equipment using the first radio access technology, a medium access control address of the user equipment on the second radio access technology;
adding the medium access control address to an access list for the second radio access technology access point; and
removing the medium access control address from the access list in response to a lack of activity for the user equipment on the second radio access technology.

5. A method comprising:
receiving at least a portion of a message encrypted using a first radio access technology protocol, where receiving uses a second, different radio access technology;
decrypting the at least a portion of the message using the first radio access technology protocol; and
filtering incoming transmissions on the second radio access technology using a medium access control address of the second radio access technology;
wherein the method further comprises receiving, using the first radio access technology protocol, instructions to configure a user equipment for operation on the second radio access technology, wherein the instructions include an identification of a second radio access technology access point, wherein the encrypted message is also integrity protected, and wherein the message is configured to discard a packet data unit and an integrity verification failure identification is indicated when an integrity verification fails;
where the first radio access technology is a Universal Terrestrial Radio Access Network (UTRAN) packet data convergence protocol and the second radio access technology is a wireless local area network, wherein the encryption of the message comprises only a single Long Term Evolution (LTE) encryption, and wherein the sending of the at least a portion of the LTE encrypted message using the wireless local area network does not further encrypt the at least a portion of the LTE encrypted message.

6. The method of claim 5, further comprising:
binding medium access control address of the second radio access technology to a first radio access technology identity.

7. The method of claim 5, where decrypting the message occurs at a first protocol layer, and the method further comprises sending the decrypted message to a higher, second protocol layer, wherein the first protocol layer comprises a packet data convergence protocol (PDCP) layer, wherein the method further comprises determining whether the decrypted message passes a cyclic redundancy check at the second protocol layer, and determining whether the decrypted message passes the integrity verification at the second protocol layer.

8. The method of claim 5, where the at least a portion of the encrypted message is a first portion, the method further comprising:
receiving the second portion of the encrypted message using the first radio access technology;
decrypting the second portion of the message using the first radio access technology protocol; and
combining the decrypted first portion and the decrypted second portion to generate a decrypted message.

9. An apparatus, comprising at least one processor; and at least one memory including computer program code, the at least one memory and the computer program code configured to, with the at least one processor, cause the apparatus to perform at least the following:
to encrypt a message using an encryption technique for a first radio access technology;
to send, to a user equipment, at least a portion of the encrypted message using a different, second radio access technology,
where sending using the second radio access technology does not further encrypt the at least a portion of the encrypted message; and
to filter incoming transmissions on the second radio access technology using a medium access control address of the second radio access technology;
wherein the at least one memory and the computer program code are further configured to cause the apparatus to send, to the user equipment using the first radio access technology, instructions for the user equipment to configure for operation on the second radio access technology, wherein the instructions include an identification of a second radio access technology access point, wherein the encrypted message is also integrity protected, and wherein the message is configured to discard a packet data unit and an integrity verification failure identification is indicated when an integrity verification fails;
where the first radio access technology is a Universal Terrestrial Radio Access Network (UTRAN) packet data convergence protocol and the second radio access technology is a wireless local area network, wherein the encryption of the message comprises only a single Long Term Evolution (LTE) encryption, and wherein the sending of the at least a portion of the LTE encrypted message using the wireless local area network does not further encrypt the at least a portion of the LTE encrypted message.

10. The apparatus of claim 9, where the at least a portion of the encrypted message is a first portion, and the at least one memory and the computer program code are further configured to cause the apparatus:
to split the encrypted message into the first portion and a second portion; and
to send the second portion of the encrypted message using the first radio access technology.

11. The apparatus of claim 9, where encrypting the message occurs at a first protocol layer, and sending the at least a portion of the encrypted message occurs at a lower second protocol layer.

12. The apparatus of claim 9, where the at least one memory and the computer program code are further configured to cause the apparatus:
to receive, from the user equipment using the first radio access technology, a medium access control address of the user equipment on the second radio access technology; and
to add the medium access control address to an access list for a second radio access technology access point.

13. A non-transitory computer readable medium tangibly encoded with a computer program executable by a processor to perform actions comprising;
  encrypting a message using an encryption technique for a first radio access technology;
  sending, to a user equipment, at least a portion of the encrypted message using a different, second radio access technology,
  where sending using the second radio access technology does not further encrypt the at least a portion of the encrypted message; and
  filtering incoming transmissions on the second radio access technology using a medium access control address of the second radio access technology;
  wherein the sending further comprises sending, to the user equipment using the first radio access technology, instructions for the user equipment to configure for operation on the second radio access technology, and wherein the instructions include an identification of a second radio access technology access point, wherein the encrypted message is also integrity protected, and wherein the message is configured to discard a packet data unit and an integrity verification failure identification is indicated when an integrity verification fails;
  where the first radio access technology is a Universal Terrestrial Radio Access Network (UTRAN) packet data convergence protocol and the second radio access technology is a wireless local area network, wherein the encryption of the message comprises only a single Long Term Evolution (LTE) encryption, and wherein the sending of the at least a portion of the LTE encrypted message using the wireless local area network does not further encrypt the at least a portion of the LTE encrypted message.

14. The computer readable medium of claim 13, where the at least a portion of the encrypted message is a first portion, the actions further comprising:
  splitting the encrypted message into the first portion and a second portion; and
  sending the second portion of the encrypted message using the first radio access technology.

15. The computer readable medium of claim 13, where encrypting the message occurs at a first protocol layer, and sending the at least a portion of the encrypted message occurs at a lower second protocol layer.

16. The computer readable medium of claim 13, further comprising:
  receiving, from the user equipment using the first radio access technology, a medium access control address of the user equipment on the second radio access technology; and
  adding the medium access control address to an access list for a second radio access technology access point.

* * * * *